United States Patent [19]
Keller

[11] 3,856,468
[45] Dec. 24, 1974

[54] METHOD FOR DETERMINING FLUID SATURATIONS IN PETROLEUM RESERVOIRS

[75] Inventor: Theodore E. Keller, Yorba Linda, Calif.

[73] Assignee: Union Oil Company of California, Los Angeles, Calif.

[22] Filed: Dec. 7, 1972

[21] Appl. No.: 312,814

[52] U.S. Cl. .......................... 23/230 EP, 166/252
[51] Int. Cl. ..................... E21b 43/16, G01n 33/24
[58] Field of Search..... 23/230 Ep, 230 R; 166/250, 166/252, 275

[56] References Cited
UNITED STATES PATENTS

| | | | |
|---|---|---|---|
| 3,334,688 | 8/1967 | Blackwell et al. | 166/252 X |
| 3,623,842 | 11/1971 | Deans | 23/230 EP |
| 3,751,226 | 8/1973 | Hesse et al. | 23/230 EP |

Primary Examiner—Robert M. Reese
Attorney, Agent, or Firm—Dean Sandford; Richard C. Hartman; Lannas S. Henderson

[57] ABSTRACT

A method for determining the relative amounts of the immiscible fluid phases present in a subterranean formation containing at least one mobile fluid phase. A carrier fluid miscible with the mobile fluid phase and containing low concentrations of at least two chemical substances, one substance being a precursor that reacts in the formation to form a tracer material that partitions between the immiscible fluid phases differently than the precursor and a second substance being a substantially nonreactive tracer material, is injected through a well and displaced into the formation away from the well. The well is shut in for a period sufficient for the precursor to react, and the well thereafter returned to production. The produced fluids are analyzed for the presence of the tracer materials, and the fluid saturations of the formation determined by applying the principles of chromatography.

12 Claims, 14 Drawing Figures

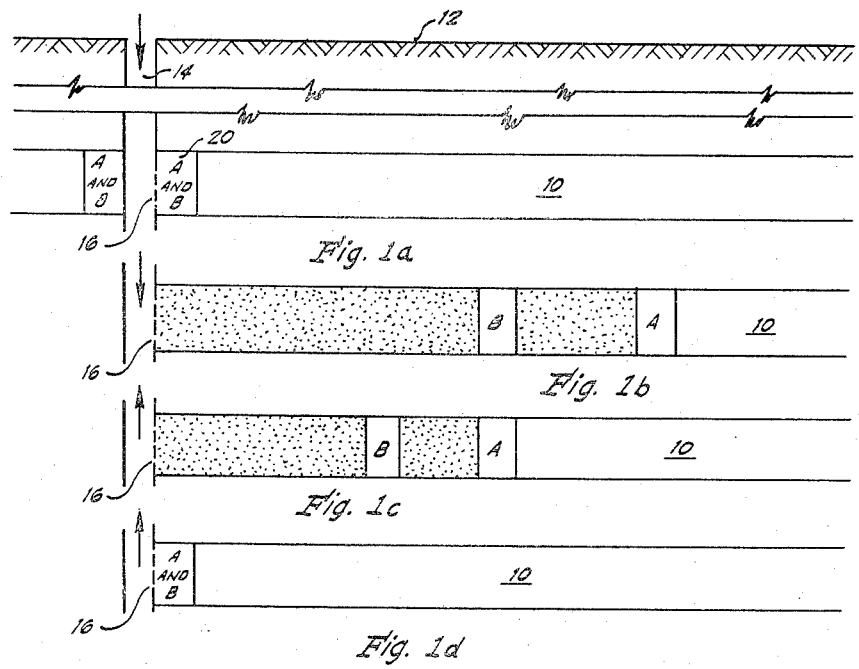
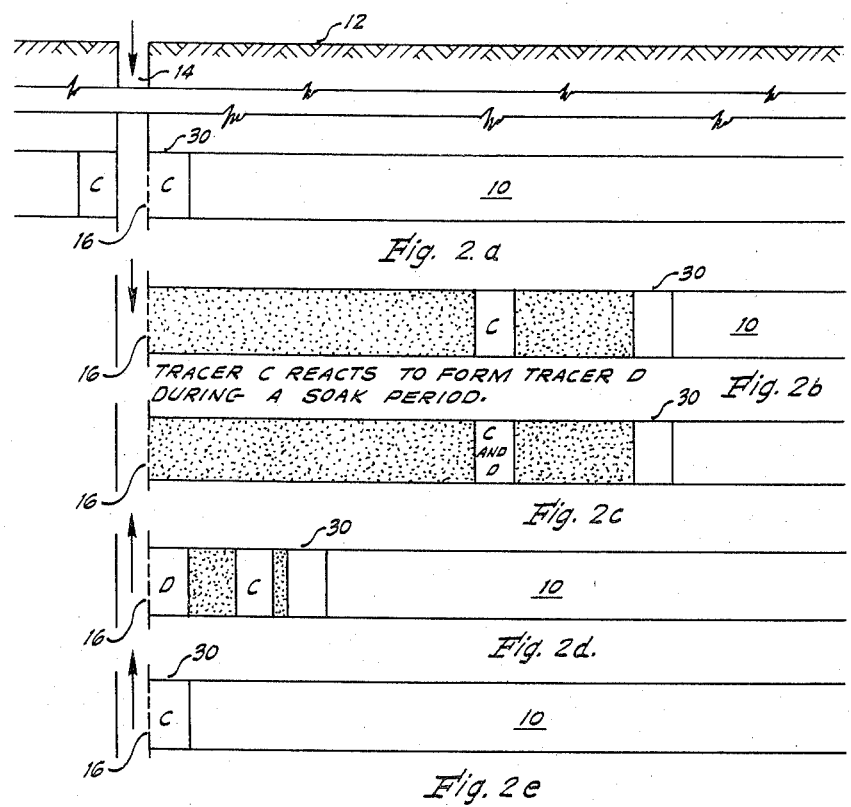

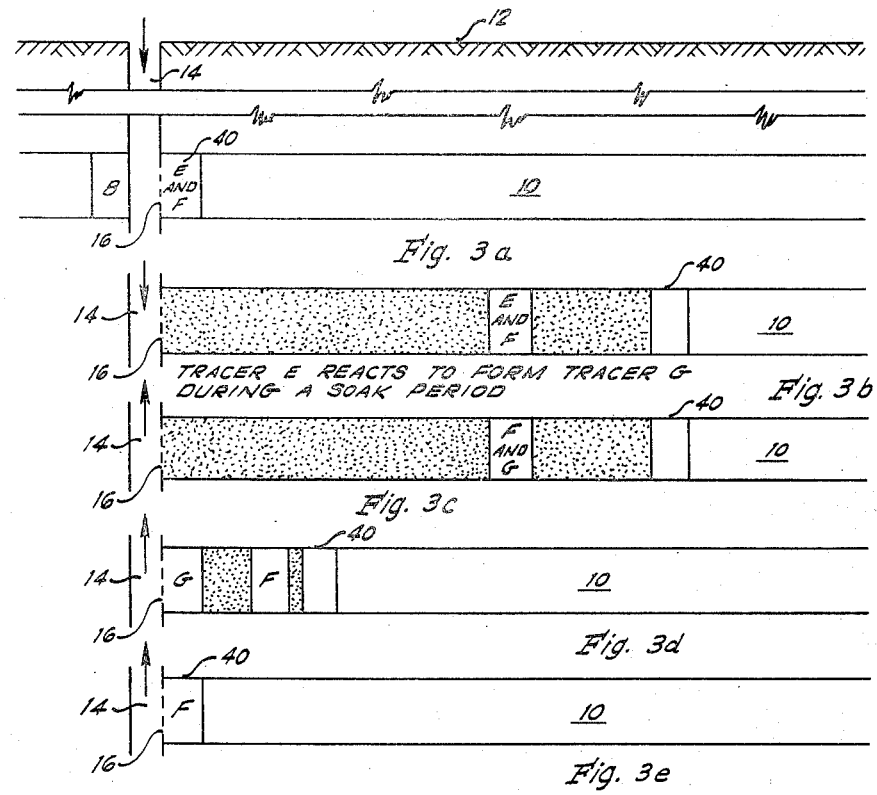
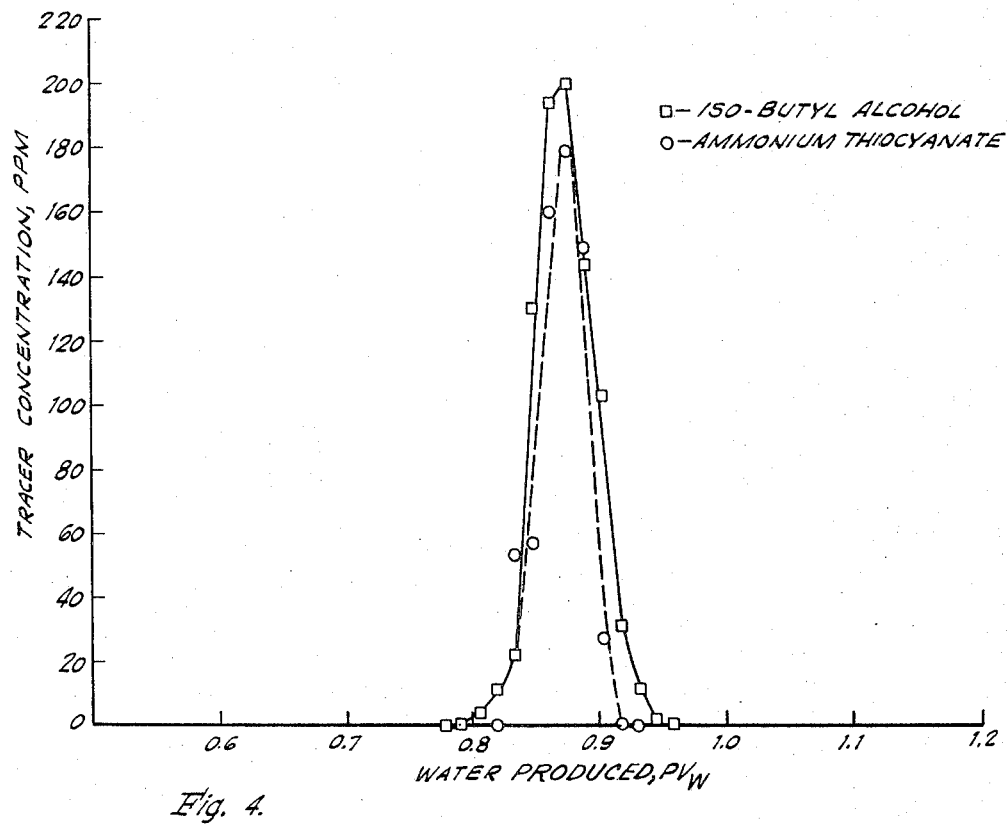

METHOD FOR DETERMINING FLUID SATURATIONS IN PETROLEUM RESERVOIRS

This invention relates to the determination of fluid saturations in permeable subterranean formations, and more particularly to the determination of fluid saturations in a permeable subterranean formation in which at least one of the phases is mobile.

A typical petroleum reservoir is a stratum of rock containing tiny interconnected pore spaces which are saturated with oil, water and/or gas. Knowledge of the relative amounts of these fluids in the formation is essential for the efficient recovery of the petroleum. For example, when a reservoir is first drilled it is necessary to know the original oil and gas saturations to intelligently plan the future exploitation of the reservoir. Also, in the secondary and tertiary recovery of petroleum from depleted reservoirs, the quantity of oil present in the reservoir will often dictate the most efficient manner of conducting the operation and provide an indication of its expected profitability.

There are several methods which are currently used to obtain the fluid saturations of a formation, coring of the formation being one commonly used technique for acquiring this information. Coring is accomplished by drilling into the reservoir and obtaining a sample of the formation rock saturated with its fluids, which is cut from the formation and removed to the surface where its fluid content can be analyzed. This method, however, is susceptible to faults of the sampling technique; thus, the sample taken may not be representative of the formation as a whole. Also, there is a high likelihood that the coring process itself may change the fluid saturation of the extracted core. Moreover, coring can only be employed in newly drilled wells or open hold completions. In the vast majority of wells, casing is set through the oil-bearing formation when the well is initially completed. Core samples, therefore, cannot be subsequently obtained from such a well. Finally, coring by its very nature only investigates the properties of the formation rock and fluids in the core itself, and this data cannot be extrapolated with accuracy to areas of the formation removed from the well.

Another approach for obtaining reservoir fluid saturations is by interpretation of well logs. While this technique is relatively simple and inexpensive to carry out, logging investigates the formation for only a short distance beyond the well bore. Moreover, the logs are a measure of the properties of the rock-fluid system as an entity, and it is difficult by this approach to differentiate between the properties of the rock and its fluids.

Fluid saturations can also be approximated by material balance calculations based on production histories. However, estimates of fluid saturations made by this method are subject to even greater error than coring or logging since the initial fluid saturation must be determined by some other technique and an accurate history of the quantity and source of the produced fluids independently obtained.

U.S. Pat. No. 3,623,842 to Deans proposes a method for measuring fluid saturations in a hydrocarbon-bearing formation containing a mobile fluid and an immiscible fluid in which a carrier liquid containing a reactant tracer material is injected into the formation and displaced away from the well. The reactant material is permitted to remain at rest in the formation for a period of time. During this "soak period" at least a part of the reactant reacts to form a product having a different partition coefficient between the carrier fluid and the immiscible phase than the reactant material. Subsequently, the carrier fluid, the unconsumed reactant and the reaction product are displaced through the formation, preferably to the injection well by produced fluids. Since the reactant and the product having differing partition coefficients between the mobile and the immiscible phases, they are chromatographically retarded in their passage through the formation by different amounts which are a function of the saturations of the immiscible fluid phases. By detecting the presence of the reactant and the product in the produced fluids and analyzing these results by chromatographic techniques, the relative proportions of mobile and immiscible fluids in the formation can be determined.

While the proposed reacting tracer method overcomes some of the disadvantages of the other known methods for determining fluid saturations, other disadvantages are encountered which adversely affect the accuracy and utility of this method. For example, the method requires the use of a reactant material that is only partially reacted under the reservoir conditions so that both the reactant material and the product are present in the produced fluids in detectable quantities. It is difficult to select a reactant material that exhibits a desired partition coefficient; that only partially reacts under a wide variety of reservoir conditions to form a product having a suitable, but different partition coefficient; and in which both the reactant and the product are present in detectable quantities in the recovered fluids. In order that detectable concentrations of both the reactant and the product materials be obtained, it is often necessary to increase the concentration of the reactant material in the injected carrier liquid. Also, the residence time that the tracer materials are in the reservoir must by carefully controlled to obtain sufficient reaction to provide a detectable concentration of product, yet retain detectable concentrations of reactant. This is difficult and costly to carry out because of the increased chemical usage, difficulty in finding suitable tracers, difficulty in predicting reaction conditions, and because of the careful control of residence or exposure time that is required. Thus, need exists for a simplified, more efficacious method for employing chromatographic principles to determine fluid saturations in a petroleum reservoir.

Accordingly, it is a principle object of this invention to provide a method for measuring fluid saturations in a petroleum reservoir containing at least one mobile fluid phase.

Another object of the invention is to provide a simple, practical, inexpensive method for employing chromatographic techniques to determine the fluid saturations in an oil-bearing formation containing at least one mobile fluid phase.

Still another object of this invention is to provide a method for measuring the water and oil saturations in a petroleum reservoir that has been depleted to essentially residual oil saturation.

Other objects and advantages of the invention will be apparent from the following description.

Briefly, this invention contemplates a method for determining the relative amounts of the immiscible fluid phases present in a subterranean formation containing at least one mobile fluid phase. A carrier fluid miscible with the mobile fluid phase and containing low concentrations of at least two chemical substances, one substance being a precursor that reacts in the formation to form a tracer material that partitions between the immiscible fluid phases differently than the precursor and a second substance being a substantially nonreactive tracer material, is injected through a well and displaced into the formation away from the well. The well is shut in for a period sufficient for the precursor to react, and the well thereafter returned to production. The produced fluids are analyzed for the presence of the tracer materials and the fluid saturations of the formation determined by applying the principles of chromatography.

The invention will be more readily understood by reference to the accompanying drawings, in which:

FIGS. 1a, 1b, 1c and 1d are schematic diagrams illustrating the reversibility of chromatographic processes conducted in a formation surrounding a well in which nonreactive chemical tracers are employed;

FIG. 2a, 2b, 2c, 2d and 2e are schematic diagrams illustrating the progressive stages of a prior art chromatographic method for determining fluid saturations in an oil-bearing formation surrounding a well employing a reacting chemical tracer;

FIGS. 3a, 3b, 3c, 3d and 3e are schematic diagrams illustrating the progressive stages of one embodiment of the chromatographic method of this invention for determining fluid saturations in an oil-bearing formation surrounding a well employing a two tracer method wherein one of the tracers is formed in situ and the other tracer is nonreacting;

FIG. 4 is a graph showing the elution profiles for the tracers contained in the fluids recovered from a test model treated in accordance with the method illustrated in FIGS. 1a through 1d, as determined in Example 1;

Figure 5:
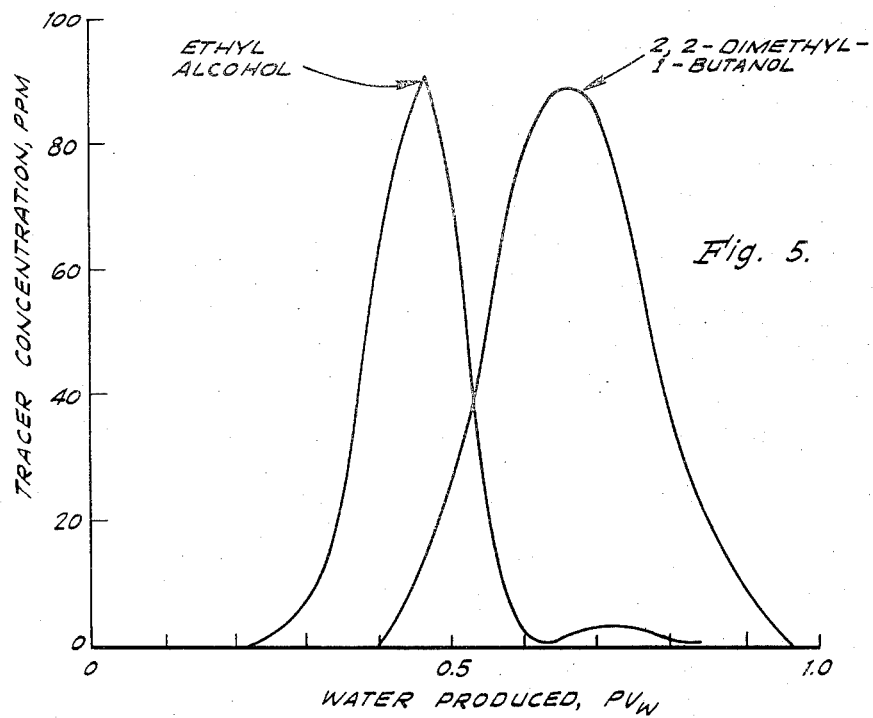
Figure 6:
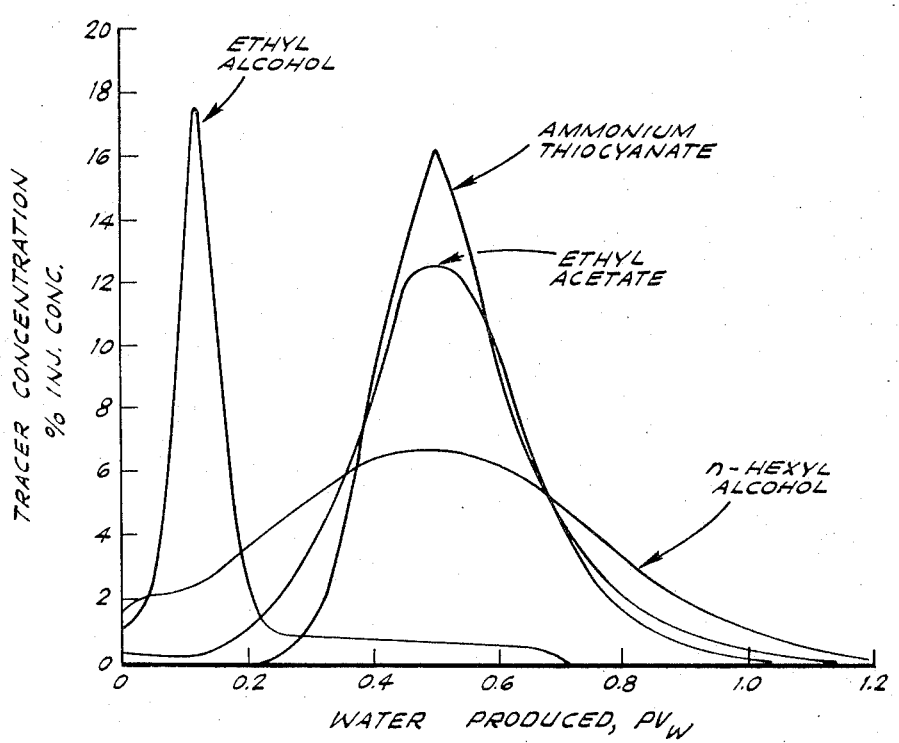

FIG. 5 is a graph showing the elution profiles for the tracers contained in the fluids recovered from a test model treated in accordance with the two tracer method illustrated in FIGS. 3a through 3e, as determined in Example 2; and FIG. 6 is a graph showing the elution profiles for the tracers contained in the fluids recovered from a test model simulating a subterranean petroleum reservoir treated in accordance with the two tracer method illustrated in FIGS. 3a through 3e, as determined in Example 3.

The relative solubility of a tracer between two immiscible fluid phases can be predicted by the partition coefficient, which is expressed by the following relationship:

$$K_A = C_{Ai}/C_{Am} \qquad 1.$$

wherein $K_A$ is the partition coefficient of tracer A between a given mobile phase and a second immiscible phase at a specified temperature;

$C_{Ai}$ is the concentration of tracer A in the second immiscible phase; and $C_{Am}$ is the concentration of tracer A in the mobile phase.

The partition coefficient for any tracer between two immiscible fluids will depend upon the particular immiscible fluids involved and the temperature. Theoretically, the partition coefficient of any tracer will vary between 0 for a tracer that is completely insoluble in the immiscible phase to infinity for a tracer that is completely insoluble in the mobile phase. A partition coefficient of 1 signifies that the tracer is equally soluble in the mobile phase and in the immiscible phase. In most tracer applications, it is essential that the tracer be soluble in the mobile carrier liquid, hence tracers having infinite partition coefficients are impractical. Accordingly, tracers having partition coefficients between about 0 and 100 are typically employed.

It is known that when tracer chemicals are transported through a permeable earth formation by a mobile fluid, the tracers move through the earth formation at a velocity that is proportional to the fraction of the tracer in the mobile phase. Thus, a tracer that does not partition, or dissolve, in a second immiscible phase will move through the reservoir at a velocity equal to the velocity of the mobile carrier fluid. If the tracer partitions between the mobile carrier fluid and the immiscible phase, the tracer will move through the formation at a velocity inversely proportional to the fraction of the time that the tracer is dissolved in the immiscible phase. Thus, if a solution containing a mixture of tracer chemicals having different partition coefficients is injected into a permeable earth formation through an injection well and transported through the formation to a second well spaced apart from the injection well, the tracer chemicals will be detected in the fluids produced from the second well at different times. The principles of chromatography can be employed to calculate the average saturations of the fluid phases in that portion of the reservoir contacted by the tracers.

This procedure requires that the tracer chemicals be transported through the formation and recovered from a location removed from the point of injection. This limitation renders the process generally unsatisfactory for use in many petroleum reservoir evaluations. A more useful process entails the injection of a mixture of tracer chemicals dissolved in a mobile carrier liquid into the oil-bearing formation, and the displacement of the tracer solution outwardly into the formation a finite distance from the injection well. The well is then produced and the recovered fluids analyzed for the presence of the tracer chemicals. However, because of the reversibility of the chromatographic effect, the tracer chemicals, even though separated in the formation, will return to the well at the same time, thus providing no indication of the relative fluid saturations encountered in the formation.

The reversibility phenomena encountered in a single well tracer detection treatment is illustrated in FIGS. 1a through 1d, which show a subterranean, oil-bearing formation 10 lying beneath the surface of the earth 12. Formation 10 is penetrated by a well 14 which has been drilled from the surface. The well is perforated at 16 to provide fluid communication between the interior of the well and the formation. As illustrated in FIG. 1a, a slug of mobile carrier liquid 20 containing dissolved tracers A and B is injected into formation 10, and is displaced into the formation by subsequently injected liquid that does not contain the added tracers. Tracer A is insoluble in a second immiscible phase in the formation, and tracer B is soluble in this phase. Because of the partitioning of tracer B between the mobile carrier liquid and the immiscible phase, tracer B travels through the formation at a lower velocity than tracer A, and tracers A and B will be separated in the reservoir. After injection of sufficient displacement liquid to displace the tracers a desired distance into the reservoir, as illustrated in FIG. 1b, the well is placed on production and produced fluids recovered in conventional manner. The mobile liquid flowing through the formation to the well transports the tracers toward the well. Again, tracer A moves through the formation at a higher velocity than partitioning tracer B and, as illustrated in FIG. 1c, tracer A tends to overtake tracer B. The chromatographic effect on the velocity of the tracers during transport towards the well is of the same magnitude as encountered in the injection step and, barring temperature changes or other changes in conditions within the formation, tracers A and B will arrive at the well at the same time, which result is illustrated in FIG. 1d. Since the degree of separation of the tracers within the formation cannot be ascertained from analysis of the recovered fluids, the relative fluid saturations cannot be determined from these results.

As mentioned previously, U.S. Pat. No. 3,623,842 proposes to overcome this problem by injecting a single material that reacts in the formation to form at least two tracers having different partition coefficients, one of which may be the unconsumed reactant. Theoretically, these tracers would be detected in the produced fluids at different times, thus permitting calculations of the fluid saturations. Ethyl acetate, which hydrolyzes in the formation to ethyl alcohol and acetic acid, is disclosed as a suitable reacting tracer. This technique is depicted in FIGS. 2a through 2e. As illustrated in FIG. 2a, a slug of mobile carrier liquid 30 containing reactant tracer C, which can be ethyl acetate, is injected into formation 10 which contains an immobile fluid phase at residual saturation. Additional mobile liquid is injected to displace the slug of tracer solution into the formation a desired distance, as illustrated in FIG. 2b. If the tracer C partitions between the mobile and immobile phases, it will fall behind the slug 30. The well is then shut in for a "soak period" to allow the tracer C to partially hydrolyze to D, as illustrated in FIG. 2c. In the case where tracer C is ethyl acetate, a portion of the ethyl acetate is hydrolyzed to ethyl alcohol, which corresponds to the tracer D. Acetic acid, which is the other hydrolysis product, is generally not suitable as a tracer material as the acid reacts with the alkaline constituents of the reservoir rock and will not be detectable in the produced fluids. After the soak period, the well is returned to production and produced fluids recovered from the well in conventional manner. As illustrated in FIG. 2d, the tracer C, e.g., the unreacted ethyl acetate, and the tracer D, e.g., the ethyl alcohol, exhibit different partition coefficients between the mobile and the immobile phases, and hence travel through the formation at different velocities. The tracer traveling at the higher velocity, i.e., the tracer having the lower partition coefficient, e.g., the ethyl alcohol, will be detected in the produced fluids first, followed, as illustrated in FIG. 2e, by the tracer having the lower velocity, e.g., the unreacted ethyl acetate. Since the two tracers arrive at the well at different points in the production process, chromatographic principles can be employed to calculate the relative saturations of the fluid phases.

Many of the disadvantages of the prior art reacting tracer method can be overcome by injecting a carrier fluid containing small concentrations of at least two chemical substances, one substance being a precursor that reacts in the formation to form a tracer material that partitions between the fluid phases differently than the precursor and a second substance being a substantially nonreactive tracer material. The precursor can be of the type that partitions between the fluid phases, or it can be nonpartitioning. However, it is essential that the precursor react in the formation to form in situ detectable quantities of a tracer material that partitions between the fluid phases in the formation differently than the precursor. Because of this difference in partitioning between the precursor and the tracer material formed in situ, the product tracer travels through the formation at a different velocity than the precursor and will, accordingly, be produced from the formation at a different time than the nonreactive or marking tracer, thereby providing data from which the relative fluid saturations can be calculated.

The two-tracer method of this invention is illustrated in FIGS. 3a through 3e. Referring particularly to FIG. 3a, a slug of carrier fluid 40 that is miscible with the mobile fluid phase in reservoir 10 and that contains low concentrations of materials E and F is injected through well 14 and displaced into reservoir 10 by subsequently injecting fluid that does not contain the added tracers. In the illustrated embodiment, substance E is the precursor and substance F is a nonreacting tracer material. Both substances are illustrated as partitioning between the mobile fluid and a second immiscible fluid to the same extend. As illustrated in FIG. 3b, both precursor E and tracer F move through the reservoir at substantially the same velocity, both substances falling behind carrier fluid slug 40. However, it is to be recognized that tracer F can have a higher partition coefficient than precursor E, in which case the precursor will travel through the reservoir at higher velocity than the tracer; or that tracer F can have a lower partition coefficient than precursor E, in which case tracer F will travel through the reservoir at a higher velocity than the precursor, or that one or both substances can be insoluble in the immiscible fluid in the reservoir, in which case that substance will remain in carrier fluid slug 40. The only requirements affecting the relative partitioning of the precursor and the product tracer formed in situ is that the injected materials be soluble in or miscible with the carrier fluid at the concentrations employed, and that the product tracer partition differently than the precursor.

After displacement of carrier fluid slug 40 into the reservoir a desired distance, the well is shut in for a "soak period" to allow precursor E to react to form tracer material G, as illustrated in FIG. 3c. It is only required that the reaction be sufficiently complete to form detectable concentrations of tracer G in the produced fluids. Thus, the precursor can be only partially reacted, or the reaction can be complete. Under conditions normally encountered in subterranean petroleum reservoirs, the precursor will react sufficiently to form a detectable quantity of tracer material in a period of about 1 to 30 days, and often within a period of about 1 to 20 days. After the soak period, the well is returned to production and the produced fluids recovered from the well in conventional manner.

As illustrated in FIG. 3d, the tracer G formed in situ travels through the reservoir at a higher velocity than tracer F and, accordingly, will be detected in the produced fluids first, followed, as illustrated in FIG. 3e, by the tracer having the lower velocity. Tracer F, any unreacted precursor E, and carrier fluid slug 40 will arrive at the well simultaneously. Since the two tracers arrive at the well at different points in the production process, chromatographic principles can be employed to calculate the relative saturations of the fluid phases. It is to be recognized that the production sequence of tracer F and tracer G will depend upon their relative partition coefficients, and that their respective elution profiles can be used to calculate fluid saturations so long as the peak tracer concentrations do not occur in the produced fluids simultaneously.

In its broadest application, the method of this invention can be employed to measure the saturations of fluids in any permeable formation containing at least one mobile fluid phase. Thus, the formation can contain mobile oil, gas and water phases, or one or more of these phases may not be present, or may be at residual saturation. The method has particular application to the measurement of oil and water saturations in the absence of a free gas phase. In these applications, both mobile oil and water can be present, or either the water or the oil can be at residual saturation. The method is particularly adapted to the measurement of oil and water saturations in reservoirs containing only residual oil and no free gas phase.

The selection of the carrier fluid, the precursor, and the nonreacting tracers is dependent upon the particular fluids present in the reservoir, and the particular saturation measurements desired. The carrier fluid may be either a liquid or gas so long as it is miscible with one of the mobile fluid phases present in the reservoir. Thus, where a mobile gas phase is present, the carrier fluid can be a gas; in the case where mobile oil is present, the carrier fluid can be an oleaginous liquid, such as oil; and in the case where mobile water is present, the carrier fluid can be an aqueous liquid, such as water or brine. Since most producing oil wells produce both oil and water, whether or not a mobile gas phase is present, it is preferred in many instances to employ water or brine, such as previously produced oil field brine, as the carrier fluid.

In the case of reservoirs at or near depletion, where essentially only water is being produced, the precursor and one or more nonreacting tracer materials are dissolved in a quantity of water. Production from the well is interrupted and the tracer solution injected through the well and into the reservoir. Thereafter an additional quantity of water is injected to displace the tracer solution outwardly into the formation away from the well. However, in those reservoirs containing mobile oil and mobile water and producing substantial quantities of oil along with the water, it is preferred to inject both oil and water through the well and into the reservoir in the same proportion as normally produced by the particular strata being tested, thereby preventing changes in the fluid saturations in the strata contacted by the tracers. Thus, where the producing water/oil ratio of a well or a particular strata to be tested is 4, the precursor and the marking tracer are dissolved in either the water or the oil and the tracer solution injected simultaneously with the other fluid in the proportion of 4 parts of water per part of oil. The tracer solution is then displaced into the reservoir by the subsequent simultaneous injection of water and oil in the same proportions. Where a mobile gas phase is present in the strata to be tested, and produced along with the other fluids, it is preferred that gas also be injected along with the other fluid phases in the same proportion as present during the normal production of the well.

The precursor employed in the practice of this invention is selected for its solubility in the carrier liquid, partitioning properties between the various fluid phases in the reservoir, reactivity under reservoir conditions, ease of detection in the produced fluids, concentrations required, cost and toxicity. Ideally, the precursor is soluble in or miscible with the carrier fluid and insoluble or immiscible with the other fluid phases encountered in the formation, and the product tracer partitions between the fluid phases. Since, in this case, the precursor does not partition during injection, it would fully penetrate the formation to the extent of the volume of mobile phase injected. Since the product tracer partitions between the fluid phase, it will travel the formation at a reduced velocity during the recovery operation. However, tracers exhibiting all of the properties of the ideal tracer under the conditions encountered in any particular test are very limited in number. The available precursors exhibit the desired properties in varying degrees, thus in many instances it is necessary to select a precursor that is less than ideal in some respects in order that the material exhibit other desirable properties. In this regard, precursors exhibiting a wide variety of properties can be employed, it only being required that the precursor and the product tracer exhibit different partition coefficients under the conditions encountered in the reservoir.

Materials that can be employed as the precursor used in the method of this invention include alkyl esters characterized by the formula $$RCO_2R_1 \; ;$$

alkyl amine hydrofluorides characterized by the formula $$R_2R_3R_3N.HF;$$

alkyl sulfate salts characterized by the formula $$R_4SO_4M; \text{ and}$$

alkyl carbamates characterized by the formula $$NH_2CO_2R_4;$$

wherein R is hydrogen or an alkyl radical containing about one to 10 carbon atoms, and preferably hydrogen or an alkyl radical containing about one to five carbon atoms; $R_1$ is an alkyl radical containing one to 10 carbon atoms, and preferably an alkyl radical containing one to five carbon atoms; $R_2$ is an alkyl radical containing about one to 10 carbon atoms, $R_3$ is the same or different members of the group consisting of hydrogen and alkyl radicals containing up to about nine carbon atoms, and wherein the sum of the carbon atoms in the $R_2$ and $R_3$ groups attached to the nitrogen atom is about one to 10, and preferably about five to seven; $R_4$ is an alkyl radical containing from about one to 10 carbon atoms, and preferably from about three to seven carbon atoms; and M is an alkali metal or ammonium.

Exemplary materials that can be employed as the precursor are listed in Table 1.

TABLE 1

PRECURSORS AND THE RESULTING PRODUCT TRACERS

| Precursor | Product Tracer |
|---|---|
| Alkyl Esters | |
| Ethyl formate | Ethyl alcohol |
| Ethyl acetate | Ethyl alcohol |
| Propyl acetate | Propyl alcohol |
| Butyl acetate | Butyl alcohol |
| Ethyl propionate | Ethyl alcohol |
| Propyl propionate | Propyl alcohol |
| Butyl propionate | Butyl alcohol |
| Alkyl Amine Hydrofluorides | |
| Pentyl amine hydrofluoride | Pentyl amine |
| Hexyl amine hydrofluoride | Hexyl amine |
| Heptyl amine hydrofluoride | Heptyl amine |
| Diethyl amine hydrofluoride | Diethyl amine |
| Triethyl amine hydrofluoride | Triethyl amine |
| Alkyl Sulfate Salts | |
| Pentyl sodium sulfate | Pentyl alcohol |
| Hexyl sodium sulfate | Hexyl alcohol |
| Heptyl sodium sulfate | Heptyl alcohol |
| Alkyl Carbamates | |
| Pentyl carbamate | Pentyl alcohol |
| Hexyl carbamate | Hexyl alcohol |
| Heptyl carbamate | Heptyl alcohol |

Any conventional radioactive or chemical tracer material that is soluble in or miscible with the carrier fluid, that does not react to any appreciable extent under reservoir conditions, and that is not appreciably adsorbed by the reservoir rock, can be employed as the nonreactive or marker tracer. These tracer materials are well known and include radioactive tritium, water-soluble and oil-soluble alcohols, ammonium thiocyanate, water-soluble and oil-soluble aldehydes, water-soluble iodide salts, water-soluble salicylate such as the ammonium and alkali metal salts of salicylic acid, and the like. It is preferred that the marker tracer partition between the fluid phases to about the same extent as the precursor. This will avoid inaccuracies caused by fluid drift within the reservoir. For example, if a water-soluble precursor that is insoluble in oil is employed, it is preferred that the marker tracer also be soluble in water and insoluble in oil; and if the precursor partitions between oil and water, it is preferred that the marker tracer exhibit about the same partition characteristic.

The precursor and the marker tracer are employed in dilute concentrations, i.e., at concentrations low enough to be in the range that the partition coefficients are linear, that avoid chromatographic overloading, and that do not appreciably increase the volume of the fluid phase into which they partition. Typically, where chemical tracers are used, the precursor and marker tracer can be employed at concentrations of less than about 3 weight percent, and more preferably at about 100 to 10,000 ppm. Where radioactive tracers are employed, the tracer material should be injected in an amount sufficient to provide about 0.1 to 2 Curies of radiation.

The volume of carrier fluid containing the precursor and marker tracer injected should be the smallest volume that provides a detectable peak in the elution profile. The minimum slug size required depends upon the degree of dispersion in the formation. An elution profile having a sharp peak provides maximum accuracy. Injection of an excessive volume of tracer solution causes broad, flat peaks in the elution profile that are difficult to interpret accurately. In most instances, satisfactory results can be obtained by injecting a volume of tracer-containing carrier fluid equivalent to about 0.01 and 0.05 pore volume of that portion of the formation to be contacted. After injection of the tracer-containing fluid, an additional quantity of tracer-free fluid is injected to displace the tracer-containing fluid outwardly into the formation a desired distance, which is preferably equivalent to a uniform cylinder having a radius of from about 5 to 50 feet.

The relative saturations of oil and water in a reservoir containing only residual oil and no free gas can be calculated from the following equations:

$$S_o/S_w = V_B - V_A/K_B V_A - K_A V_B \qquad 2.$$

$$S_o + S_w = 1 \qquad 3.$$

wherein
$S$ is the fluid saturation in the porous formation expressed as a decimal fraction;
$V$ is the volume of the mobile phase produced at tracer peak arrival;
$K$ is the partition coefficient as previously defined; and in the subscripts
$A$ is tracer $A$;
$B$ is tracer $B$;
$o$ is oil; and
$w$ is water.

Where a mobile oil phase is present, equation 1 can be modified as follows:

$$S_o/S_w = V_B - V_A(MO)/K_B V_A(MO) - K_A V_B \qquad 4$$

where the term MO is a correction for the mobile oil, and is determined by the following relationship:

$$MO = (Q_o/Q_w)K_A + 1/(Q_o Q_w)K_B + 1 \qquad 5$$

and wherein Q is the volumetric flow rate of a designated fluid.

These calculation techniques assume that no mobile gas phase is present. However, the presence of a mobile gas phase is not detrimental to the practice of the invention and, in fact, the gas saturation of the formation can also be determined by this method.

In a preferred mode of practicing the invention to determine the relative oil and water saturations in an oil reservoir containing only residual oil with essentially no mobile oil, an aqueous tracer solution is prepared by dissolving from about 100 to 10,000 ppm each of a selected precursor and a nonreactive marker tracer in water previously produced from the formation. The marker tracer is selected to exhibit about the same partition properties as the precursor. About 0.01 to 0.5 pore volume of the tracer solution is injected into the formation through a well completed in the strata of interest, and an additional quantity of tracer-free water is then injected to displace the tracer solution outwardly into the reservoir a distance of about 5 to 50 feet. The well is shut in for a soak period to allow time for the reaction of the precursor, and is thereafter returned to production and the produced water analyzed for the presence of the reactant tracer and the marker tracer. The concentration peaks of the elution profile for each tracer are determined and these data used to calculate the oil and water saturations using the technique described above.

This preferred mode can also be employed in reservoirs having mobile oil. However, it is preferred in this case to inject oil simultaneously with the tracer solution and with the displacing brine in the same proportion as oil and water produced from this strata.

The invention is further described by the following examples which are illustrative of specific modes of practicing the invention as defined by the appended claims.

EXAMPLE 1

This example illustrates the reversibility of the chromatographic absorption of the tracers in a single well tracer method using nonreacting tracers. A cylinder 1½ inches in diameter, 6-feet long is packed with No. 16 AGSCO sand. The sand pack is saturated with water, then with kerosene, and is waterflooded to a residual oil saturation of 16.4 pore volume percent with fresh water by injecting these fluids succesively through an inlet connection at one end of the test model and recovering the displaced fluids from an outlet connection at the opposite end of the model.

A tracer solution is prepared by dissolving 500 ppm of isobutyl alcohol and 500 ppm of ammonium thiocyanate in fresh water. A slug of the tracer solution equivalent to about 0.04 pore volume is injected through the inlet connection and displaced into the model with fresh water. The isobutyl alcohol partitions between the kerosene and the water phases in the test model, and the ammonium thiocyanate is essentially nonpartitioning. Thus, based upon chromatographic principles, it is expected that the ammonium thiocyanate is displaced into the test model the greatest distance, with the isobutyl alcohol being transported into the model a lesser distance. The test model is then reverse flowed by injecting water into the model through the outlet connection and recovering fluids displaced through the original inlet connection.

The recovered fluids are analyzed for the presence of tracer materials. Ammonium thiocyanate is first detected after production of 0.78 pore volume of fluid, and the isobutyl alcohol is detected after the production of 0.82 pore volume. The peak concentration of both tracers occurred at 0.875 pore volume, even though these tracers are separated in the test model and transported into the model different distances. The elution profiles are shown graphically in FIG. 4. Since there is no difference in the elution peaks of the two tracers, these data could not be utilized to calculate residual oil saturation.

EXAMPLE 2

This example illustrates the single well tracer method of this invention to measure residual oil saturation in a laboratory environment similar to that employed in Example 1. A cylindrical test model 1½ inches in diameter, 70-inches long is packed with AGSCO sand. The sand pack is saturated with water, then with kerosene, and is waterflooded to a residual oil saturation of 17.4 pore volume percent with fresh water by the technique employed in Example 1.

A tracer solution is prepared by dissolving 1,000 ppm of ethyl acetate and 500 ppm of 2,2-dimethyl-1-butanol in fresh water. A slug of the tracer solution equivalent to about 0.03 pore volume is injected through the inlet connection and displaced into the model with water. The ethyl acetate and the 2,2-dimethyl-1-butanol partition between the kerosene and the water phases in the test model to about the same degree. Thus, it would not be expected that these two materials would be separated in the test model, and they should be transported into the model about the same distance. The test model is then allowed to remain quiescent at a temperature of 165° F. for a soak period of 25 days. Next, the model is reverse flowed at room temperature by injecting water into the model through the outlet connection and recovering fluids displaced through the original inlet connection.

The recovered fluids are analyzed for the presence of ethyl alcohol, which is the hydrolysis product of ethyl acetate, and 2,2-dimethyl-1-butanol. Ethyl alcohol is first detected after the production of fluid equivalent to 0.2 water volume ($PV_{tc}$) and the 2,2-dimethyl-1-butanol after 0.4 water pore volume. The ethyl alcohol peak occurred after the production of fluids equivalent to 0.46 water pore volume and the 2,2-dimethyl-1-butanol at 0.66 water pore volume. The elution profiles are shown in FIG. 5. An oil saturation of 17.0 pore volume percent is calculated from these data as compared with a residual oil saturation of 17.4 pore volume percent determined by material balance.

EXAMPLE 3

This example illustrates the use of the method of this invention to determine the oil saturation in a watered-out petroleum reservoir containing residual oil. The test model is a Berea sandstone core 1½ inches by 1½ inches in cross-section, 4-feet long. The core is saturated with brine, then with a 35° API Texas crude, and is waterflooded with a synthetic oil-field brine containing 9.4 weight percent dissolved salts to a residual oil saturation of 34.3 pore volume percent by injecting these fluids successively through an inlet connection at one end of the test model and recovering the displaced fluids from an outlet connection at the opposite end of the model.

A tracer solution is prepared by dissolving 10,000 ppm of ethyl acetate, 2,500 ppm of ammonium thiocyanate and 2,000 ppm of n-hexyl alcohol in the brine. A slug of tracer solution equivalent to about 0.03 pore volume is injected through the inlet connection and displaced into the model with brine. The ethyl acetate and the n-hexyl alcohol partition between the oil and the water phases in the core, and the ammonium thiocyanate is essentially nonpartitioning. Therefore, it is expected that the ammonium thiocyanate is displaced into the test model the greatest distance, the ethyl acetate a lesser distance, and the n-hexyl alcohol the least distance. The model is then allowed to remain quiescent for a 12 day soak period. The test model is then reverse flowed by injecting brine through the outlet connection and recovering the fluids displaced through the original inlet connection. The model is maintained at a temperature of 150° F. during the tracer injection, the soak period, and the production steps. Under these conditions, only a portion of the ethyl acetate is hydrolyzed so as to provide a direct comparison of the method of this invention with the prior art technique employing a single reacting tracer.

The recovered fluids are analyzed for the presence of ethyl alcohol, which is the hydrolysis product of ethyl acetate, ethyl acetate, ammonium thiocyanate, and n-hexyl alcohol. The points in the recovery process at which the various tracers are initially detected and the points at which the peak concentrations occur are reported in Table 2, and the elution profiles shown in FIG. 6.

TABLE 2

| Tracer | Fluids Produced, $PV_{ir}$ | | Calculated Oil Saturation, % of pv |
|---|---|---|---|
| | Initial Detection | Peak Concentration | |
| Ethyl Alcohol | 0 | 0.1 | — |
| Ethyl Acetate | 0 | 0.5 | 33.1 |
| Ammonium Thiocyanate | 0.2 | 0.5 | 33.1 |
| N-hexyl Alcohol | 0 | 0.5 | 33.1 |

EXAMPLE 4

This example illustrates the measurement of fluid saturations in an oil reservoir having both mobile oil and mobil water phases. To simplify the demonstration, a once through system is employed, rather than the reverse flow system simulating single well treatment. However, the principles demonstrated are applicable to the single well treatment illustrated in Examples 2 and 3.

The model employed in this test is a cylinder 1½ inches in diameter and 6 feet in length, packed with AGSCO sand. The sand pack is saturated with synthetic oil-filed brine containing 9.4 weight percent dissolved salts. Brine and a 35° API Texas crude oil are then simultaneously injected through an inlet connection at one end of the test model and the displaced fluids are recovered through an outlet connection at the opposite end of the model. The injection rates are controlled to provide a water/oil ratio of 4, and the injection is continued until an equilibrium saturation is obtained.

A tracer solution is prepared by dissolving 5,000 ppm of ethyl alcohol, 10,000 ppm of ethyl acetate, and 2,000 ppm of n-hexyl alcohol in brine. A slug of the tracer solution equivalent to about 0.03 pore volume is injected through the inlet connection and the injection of crude oil and brine resumed at a water/oil ratio of 4.

Fluids are recovered through the outlet connection and analyzed for the presence of tracer materials. The points at which the various tracers are initially detected and the points at which the peak concentrations occur are reported in Table 3.

TABLE 3

| Tracer | Fluids Produced, $PV_{ir}$ | |
|---|---|---|
| | Initial Detection | Peak Concentration |
| Ethyl alcohol | 0.6 | 0.9 |
| Ethyl acetate | 1.3 | 2.4 |
| n-Hexyl alcohol | 2.1 | 3.05 |

An oil saturation of 45.5 pore volume percent is calculated using the ethyl acetate and ethyl alcohol peaks and 44.5 pore volume percent using the n-hexanol and ethyl alcohol peaks, as compared with an oil saturation of 43.1 pore volume percent calculated by material balance.

While particular embodiments of the invention have been described, it will be understood, of course, that the invention is not limited thereto since many modifications can be made and it is intended to include within the invention such modifications as are within the scope of the claims.

The invention having thus been described, I claim:

1. A method for measuring the relative saturation of immiscible fluids present in a subterranean formation penetrated by a well in communication therewith and wherein at least one of said fluids is mobile, which comprises:

injecting a carrier fluid into said formation, said carrier fluid being miscible with one of said mobile fluids and immiscible with at least one of the other fluids and containing low concentrations of (1) a precursor that partitions between the carrier fluid and the immiscible fluid and that reacts in the formation to form a first tracer material that partitions between the carrier fluid and the immiscible fluid differently than the precursor and (2) a second substantially non-reactive tracer material that partitions between the carrier fluid and the immiscible fluid to about the same degree as said percursor;

displacing said carrier fluid into said formation;

shutting in said well for a time period sufficient to permit the precursor to react to form detectable quantities of said first tracer material;

producing said well to recover fluids from said formation;

analyzing said recovered fluids to determine the concentrations of said first and second tracer materials in said fluids as a function of the volume of said fluids produced from said formation; and applying chromatographic principles to determine the relative saturation of the immiscible fluids present in said formation.

2. The method defined in claim 1 wherein said carrier fluid is displaced into said formation by the subsequent injection of a fluid miscible with said carrier fluid.

3. The method defined in claim 1 wherein at least two separate mobile water, oil and/or gas phases are produced from said well prior to the injection of said carrier fluid, wherein said carrier fluid is miscible with one of said mobile phases and is injected simultaneously with a mixture of water, oil and gaseous fluids in the same proportions as said mobile phases are produced, and wherein said carrier fluid is displaced into the formation by the subsequent injection of a mixture of water, oil and gaseous fluids in the same proportions as said mobile phases are produced.

4. The method defined in claim 1 wherein said mobile fluid present in said formation is oil and said carrier liquid is an oleaginous liquid miscible therewith.

5. The method defined in claim 1 wherein said mobile fluid present in said formation is water and said carrier fluid is an aqueous liquid miscible therewith.

6. A method for measuring the relative saturation of oil and water present in a subterranean formation penetrated by a well in communication therewith and wherein at least one of said fluids is mobile, which comprises:

injecting a liquid carrier fluid through said well and into said formation, said carrier fluid being miscible with one of said mobile fluids and immiscible with the other fluid and having dissolved therein low concentrations of (1) a precursor that partitions between the carrier fluid and the immscible fluid and that reacts in the formation to form a first tracer material that partitions between the carrier fluid and the immiscible fluid differently than the precursor and (2) a second nonreactive tracer material that partitions between the carrier fluid and the immiscible fluid to about the same degree as said precursor;

displacing said carrier fluid into said formation away from the well;

shutting in said well for a time period sufficient to permit the precursor to react to form detectable quantities of said first tracer material;

producing said well to recover fluids from said formation;

analyzing said recovered fluids to determine the concentrations of said first and second tracer materials in said fluids as a function of the volume of said fluids recovered from said formation; and applying chromatographic principles to determine the relative saturation of oil and water present in said formation.

7. The method defined in claim 6 wherein said carrier fluid is displaced into said formation by the subsequent injection of a liquid miscible with said carrier fluid.

8. The method defined in claim 6 wherein water and oil are both produced from said well prior to the injection of said carrier fluid, wherein said carrier fluid is miscible with one of said fluids and is injected simultaneously with a mixture of water and oil in the same proportions as said fluids are produced, and wherein said carrier fluid is displaced into the formation by the subsequent simultaneous injection of water and oil in the same proportions as said fluids are produced.

9. The method defined in claim 6 wherein mobile oil is present in said formation and said carrier liquid is an oleaginous liquid miscible therewith.

10. The method defined in claim 6 wherein mobile water is present in said formation and said carrier fluid is an aqueous liquid miscible therewith.

11. A method for measuring the relative saturation of oil and water present in a subterranean formation penetrated by a well in communication therewith and containing mobile water and immobile oil, which comprises:

injecting an aqueous liquid carrier fluid through said well and into said formation, said carrier fluid having dissolved therein low concentrations of (1) a precursor that partitions between the carrier fluid and the immobile oil and that reacts in the formation to form a first tracer material that partitions between the carrier fluid and the immobile oil differently than the precursor and (2) a second nonreactive tracer material that partitions between the carrier fluid and the immobile oil to about the same degree as said percursor;

injecting an aqueoous liquid through the well and into the formation to displace said carrier fluid into the formation away from the well;

shutting in said well for a time period sufficient to permit the precursor to react to form detectable quantities of said first tracer material;

producing said well to recover water from said formation;

analyzing said recovered water to detemine the concentrations of said first and second tracer materials in said water as a function of the volume of said water produced from said formation; and applying chromatographic principles to determine the relative saturation of oil and water present in said formation.

12. A method for measuring the relative saturation of immiscible fluids present in a subterranean formation penetrated by a well in communication therewith and wherein at least one of said fluids is mobile, which comprises:

injecting a carrier fluid into said formation, said carrier fluid being miscible with one of said mobile fluids and immiscible with at least one of the other fluids and containing (1) about 100 ppm to 10,000 ppm of a precursor that partitions between the carrier fluid and the immiscible fluid and that reacts in the formation to form a first tracer material that partitions between the carrier fluid and the immiscible fluid to a different degree than the precursor and (2) about 100 ppm to 10,000 ppm of a second substantially nonreactive, nonradioactive tracer material or about 0.1 to 2 Curies of a substantially nonreactive, radioactive second tracer material, said precursor and said second tracer material partitioning between the carrier fluid and the immiscible fluid to about the same degree;

injecting a displacement fluid through said well and into said formation to displace said carrier fluid into said formation an average distance of about 5 to 50 feet from said well, said displacement fluid being of the type and injected in about the same proportions as the fluids produced from said well;

shutting in said well for a period of about 1 to 30 days sufficient to permit the precursor to react to form detectable quantities of said first tracer material;

producing said well to recover fluids from said formation;

analyzing said recovered fluids to determine the concentrations of said first and second tracer materials in said fluids as a function of the volume of said fluids produced from said formation; and applying chromatographic principles to determine the relative saturation of the immiscible fluids present in the formation.

\* \* \* \* \*